United States Patent [19]

Cazal et al.

[11] Patent Number: 5,629,575
[45] Date of Patent: May 13, 1997

[54] ROTARY ELECTRICAL MACHINE, ESPECIALLY A MOTOR VEHICLE ALTERNATOR, HAVING IMPROVED ELASTIC MOUNTING MEANS FOR ITS STATOR

[75] Inventors: Christian Cazal, St. Perre du Perray; Michel Gruson, Sucy en Brie, both of France

[73] Assignee: Valeo Equipements Electriques Moteur, Creteil, France

[21] Appl. No.: 565,814

[22] Filed: Dec. 1, 1995

[30] Foreign Application Priority Data

Dec. 2, 1994 [FR] France .................... 94 14617

[51] Int. Cl.⁶ .................... H02K 1/18; H02K 5/24
[52] U.S. Cl. .................... 310/91; 310/42; 310/89; 310/258
[58] Field of Search .................... 310/91, 51, 258, 310/259, 89, 42

[56] References Cited

U.S. PATENT DOCUMENTS 4,520,987   6/1985   Eguchi et al. .................... 248/635

5,113,103   5/1992   Blum et al. .................... 310/91

FOREIGN PATENT DOCUMENTS 0240644   10/1987   European Pat. Off. .
2059177    4/1981   United Kingdom .

Primary Examiner—Steven L. Stephan
Assistant Examiner—Tran N. Nguyen
Attorney, Agent, or Firm—Morgan & Finnegan, LLP

[57] ABSTRACT

A rotary electrical machine, which is typically but not exclusively a motor vehicle alternator, is of the type comprising a casing consisting of two parts, each having a radial support surface, these support surfaces being opposed to each other with a stator lying between them. Between each end face of the stator and the corresponding support surface, there is at least one interposed elastic member which is in axial compression when the two casing parts are secured together. A set of elastic cushion blocks, spaced apart on a pitch circle defined by one of the casing parts, is interposed between the corresponding stator end face and a portion of the support surface of that casing part.

7 Claims, 3 Drawing Sheets

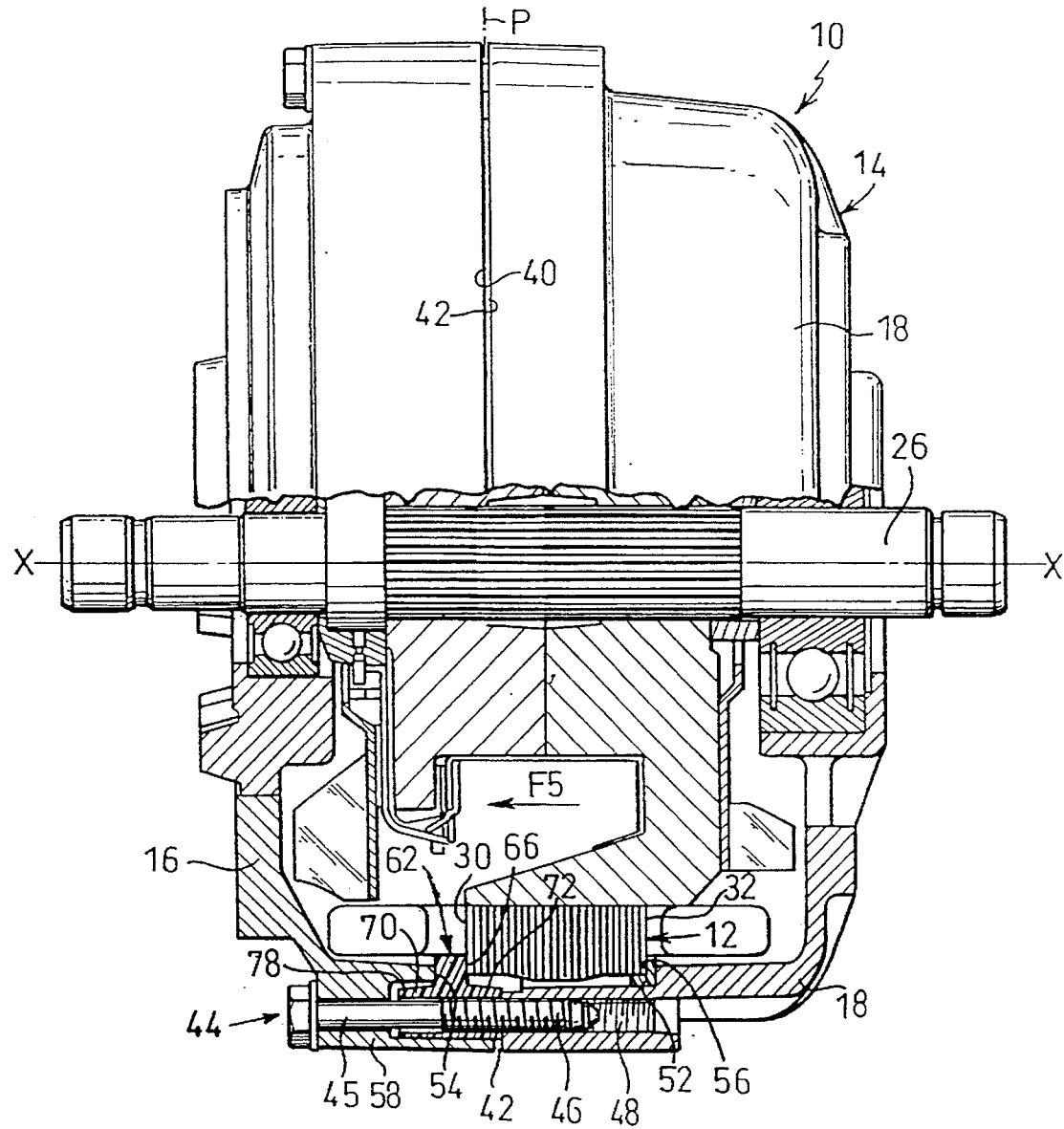

ROTARY ELECTRICAL MACHINE, ESPECIALLY A MOTOR VEHICLE ALTERNATOR, HAVING IMPROVED ELASTIC MOUNTING MEANS FOR ITS STATOR

FIELD OF THE INVENTION

The present invention relates to rotary electrical machines, and especially, though not exclusively, to alternators of the kind used for supplying power to the electrical circuitry of a motor vehicle.

More specifically, the invention relates to such a to machine of the type having a generally cylindrical and annular stator, which consists of a stack of press-formed laminated plates and which is arranged in a casing consisting of two casing parts. The casing parts are usually formed by moulding, and are joined together at a junction or interface plane which is at right angles to the axis of the rotor of the machine. The stator is clamped axially between opposed radial support surfaces, formed respectively in the two casing parts, with at least one elastically deformable element being interposed between one of these two support surfaces and a portion of the radial and annular end face of the stator associated with that support surface and in facing relationship to the latter.

BACKGROUND OF THE INVENTION

In one known design of machine of the above kind, the elastically deformable element is an annular gasket ring with an L-shaped cross section, which is fitted on the outer radial edge of one of the axial ends of the stator. Axial clamping of the stator is obtained by means of a series of attached lugs, of which there may for example be three or four. These lugs are secured by means of screws into the part of the casing in which the stator, with its axially compressible gasket ring, has previously been centred.

That solution is not very satisfactory, because it makes it necessary to ensure beforehand that the stator is mounted and clamped axially in a first casing part using a first set of threaded fasteners, and then to assemble the two parts of the casing together by means of a further set of threaded fasteners.

In European patent specification EP 0 240 644A1, it was proposed to arrange an L-shaped compressible annular ring at each of the two axial ends of the stator, with each of these rings being received in one of the two parts of the casing. Again, this solution is rather unsatisfactory, because it requires concentric machining operations to be carried out in each of the two casing parts, in such a way that the stator will be correctly centred in its final position in the two rings with respect to the two casing parts, which also constitute the bearings for the rotor of the machine.

In addition, the fitting operations which comprise the fitting of a first ring in one of the casing parts, fitting of the stator in engagement against the first ring and then the second ring, and finally the closing of the assembly with the second casing part, are very complex and difficult to carry out blind.

The above mentioned patent specification EP 0 240 644A1 also discloses a modified embodiment in which the two L-shaped annular rings are joined together by means of longitudinal cylindrical pads or cushions. The difficulties met with in assembly of this arrangement are the same as those described above: in this connection, the longitudinal cylindrical pads are detrimental to correct angular positioning and to good axial clamping, because they prevent proper distribution of the forces involved since the cylindrical pads constitute a set of spacers between the annular rings.

DISCUSSION OF THE INVENTION

An object of the present invention is to propose a novel design which overcomes the drawbacks discussed above.

According to the invention, a rotary electrical machine of the type comprising a cylindrical, generally annular stator which is arranged in a casing that consists of two parts, which are joined together in a junction plane extending at right angles to the axis of the rotor of the machine, and being also of the type in which the stator is clamped axially between the opposed, radial support surfaces which are formed in each of the two parts of the casing, with at least one elastically deformable element being interposed and axially compressed between one of the two support surfaces and a portion of the radial and annular end face of the stator in facing relationship therewith, is characterised in that it includes a set of elastically deformable cushion members spaced apart on a circle, each of which is compressed axially between the radial and annular end face of the stator and a support surface portion formed in the corresponding part of the casing.

According to a preferred feature of the invention, each cushion member is a block of elastically deformable material which has two opposed and parallel faces which bear, respectively, against the radial and annular end face of the stator and against a support surface portion, Preferably, each cushion block includes a locating lug which is received with a clearance in a seating formed in the part of the casing.

Preferably, each locating lug extends axially beyond one of the parallel engagement surfaces of the corresponding cushion block.

In a preferred embodiment of such an arrangement, each locating lug has an aperture for passage through it of the shank of a threaded fastener for axially clamping the two parts of the casing together.

Each cushion block preferably includes two locating lugs which are disposed symmetrically, with each locating lug extending axially beyond one of the two parallel engagement surfaces of the cushion block.

It is then preferably arranged that one of the two locating lugs is received with a clearance in a seating formed in the part of the casing, and that the other one of the two locating lugs, prior to the axial clamping together of the two parts of the casing, projects axially beyond the open radial and annular end face of the part of the casing which defines the junction plane.

According to a further preferred feature of the invention, an annular ring is provided for centering the stator, the centering ring being gripped axially between an annular support surface formed in the other part of the casing and the other radial and annular end face of the stator.

Further features and advantages of the invention will appear more clearly from a reading of the detailed description that follows, which is given by way of example and with reference to the accompanying drawings.

BRIEF DESCRIPTION OF THE DRAWINGS

FIG. 2 is a view in axial cross section of part of an alternator the stator of which is mounted in its casing in accordance with the present invention, the two parts of the casing being shown before being tightened securely together.

DESCRIPTION OF A PREFERRED EMBODIMENT OF THE INVENTION

Figure 1:
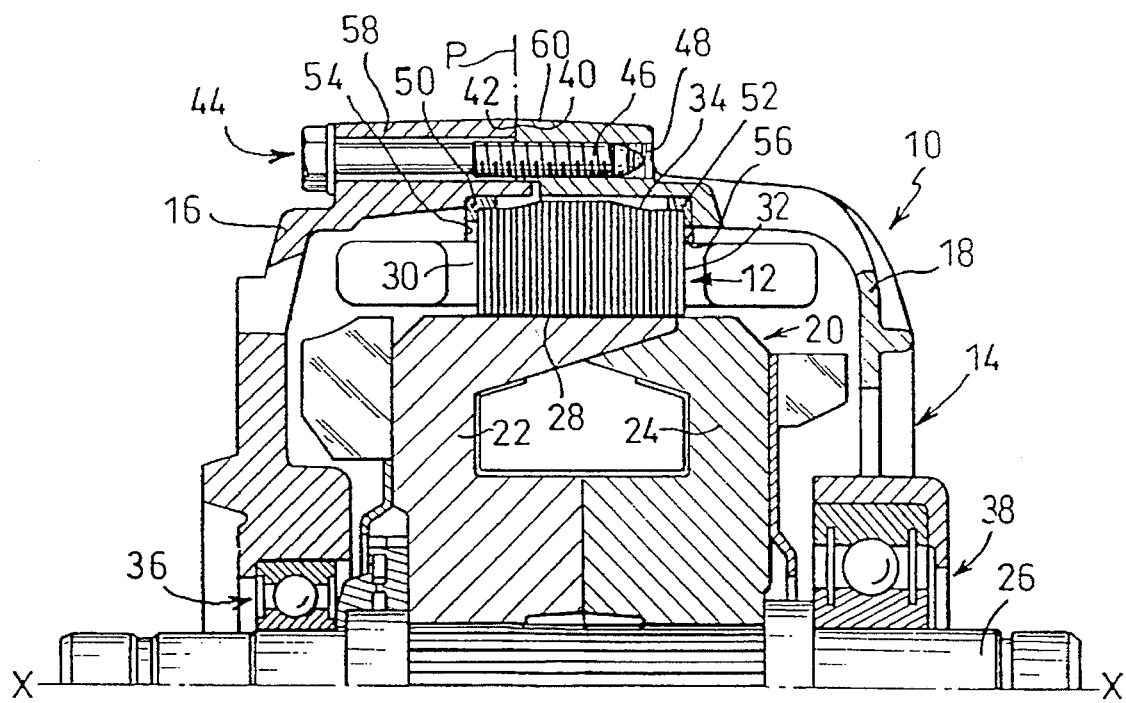
FIG. 1 is a half view in axial cross section of one embodiment of an alternator the stator of which is mounted in its casing in accordance with the present state of the art.

In the following description, those elements identical or similar to each other which are shown in the various Figures of the drawings are designated by the same reference numerals.

Reference is first made to FIG. 1, which shows an alternator 10 for a motor vehicle. The alternator 10 consists essentially of a stator 12, a casing 14 in which the stator 12 is mounted, and a rotor 20. The casing 14 is in two parts 16 and 18.

The main components of the rotor 20 are a pair of pole wheels 22 and 24 which are coupled in rotation to the rotatable shaft 26 of the rotor. The rotor 20 is mounted for rotation in an annular cylindrical chamber 28 which is defined within the stator 12.

The stator 12 comprises a stack of laminated plates, and has an annular, generally cylindrical form which is bounded by two annular, radial end surfaces 30 and 32, and a cylindrical outer surface 34.

The two parts 16 and 18 of the casing 14 (or envelope) which receives the stator 12 consist of two moulded and machined members, each of which receives a bearing 36, 38 respectively, in which the shaft 26 of the rotor 20 is rotatably carried. Each of the two parts 18 and 16 of the casing 14 has a machined radial end face 40, 42 respectively. These end faces 40 and 42, which are annular, define a junction or interface plane P for the two parts of the casing, at which the two casing parts are axially clamped together by means of a set of four threaded fastening members in the form of studs 44, which are spaced apart at regular intervals on a common pitch circle centred on the axis X—X of the alternator. The threaded part 46 of the shank of each fastening stud 44 is screwed into a corresponding threaded hole 48 formed in the casing part 18.

In the arrangement of the prior art shown in FIG. 1, the stator 12 is suspended elastically inside the casing 14, which consists of the two casing parts 16 and 18, by means of two annular centering rings 50 and 52 of L-shaped cross section. Each of these centering rings 50, 52 is made of an axially compressible material, for example an elastomer or rubber, and is interposed between a respective one of the radial and annular end surfaces 30, 32 of the stator 12 and a radial and annular support surface 54, 56 which is formed, in facing relationship with the surface 30 or 32 respectively, in a portion 58, 60 respectively of the corresponding part 16 or 18 of the casing 14. Each portion 58 and 60 is in the form of a cylindrical skirt.

An arrangement in one embodiment of the invention will now be described by way of example with reference to FIGS. 2 to 5. As can be seen in FIG. 2, one of the two annular elastic centering rings 50 of FIG. 1 is replaced by a set of elastic cushion members 62 in the form of cushion blocks. In this example there are four of these cushion blocks 62, which are spaced apart at regular intervals on a common pitch circle centred on the axis X—X, the cushion blocks being in alignment with the fastening studs 44.

Each cushion block 62 has the general form of a rectangular parallelepiped which defines two parallel and opposed engagement surfaces 64 and 66. The engagement surfaces 64, 66 bear, respectively, against a portion, in facing relationship with it, of the radial and annular end face 30 of the stator 12, and against the radial and annular support surface 54 which is machined in the casing portion 16.

Each rectangular cushion block 62 is extended laterally by a locating portion 68, which consists essentially of two opposed locating lugs 70 and 72, which extend axially on either side, and beyond, the engagement surfaces 64 and 66 of the cushion block 62. The two locating lugs 70 and 72 are made integrally (so that the cushion block is in one piece), and are both hollowed out centrally so as to define a semi-cylindrical aperture 74. This aperture 74 is arranged to enable the shank 45 of the corresponding axial fastening stud 44 to extend through the cushion block.

The axial dimensions of the two locating lugs 70 and 72 are equal, so that the cushion block 62 has a symmetrical design as a whole, which enables it to be fitted indifferently in either one of the two positions in a seating 76 of complementary form. This seating 76 is accordingly in the general form of a parallelepiped, and is formed in the corresponding portion 58 of the casing part 16.

In addition, the dimensions of the locating lugs 70 and 72 are such that each lug which is received in the seating 76 will now come into abutment against the axial base 78 of the seating; while the end face 80 of the locating lug 72, which faces towards the other casing part 18, is in axial abutment against the machined annular end face 42 of the latter prior to the operation tightening the two casing parts together, i.e. as is shown in FIG. 2.

Once the studs 44 have been tightened so as to fasten the two casing parts 16 and 18 securely together, the cushion blocks 62 are compressed axially between the surfaces 30 and 54, with the annular end surfaces 40 and 42 being held in contact with each other in the interface plane P.

Figure 3:
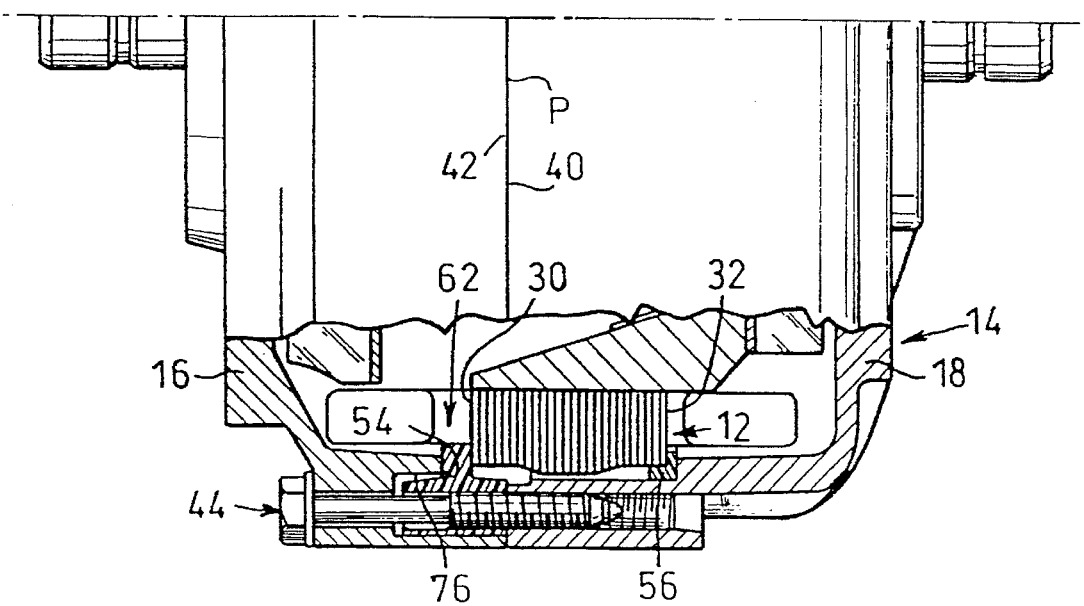
FIG. 3 is a half view in partial axial cross section, corresponding to the lower part of FIG. 2 and showing the two parts of the casing tightened securely together.
Figure 5:
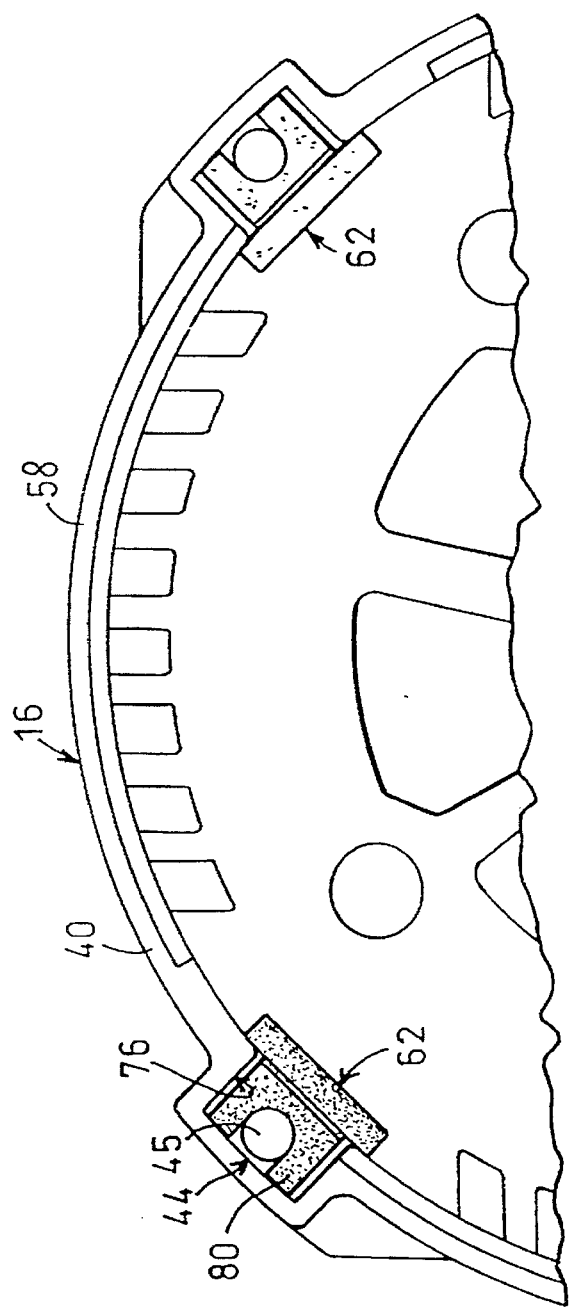
FIG. 5 is a partial view in the direction of the arrow F5 in FIG. 2, but on a larger scale, and shows the part of the casing that receives the elastic cushion blocks.
Figure 4:
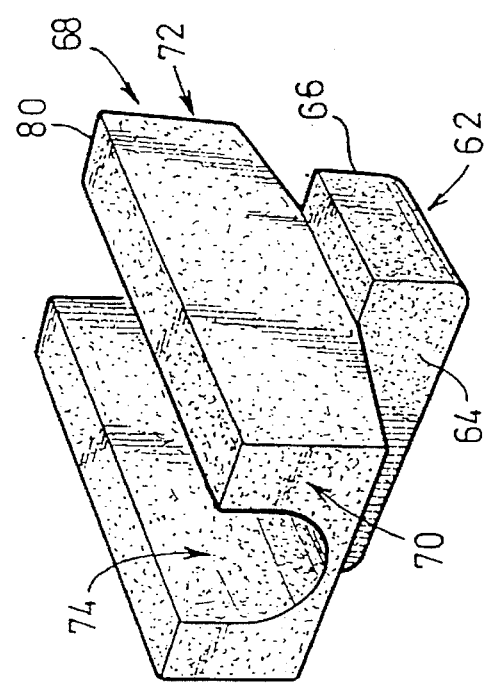
FIG. 4 is a perspective view on a larger scale, showing one of the cushion blocks used for the elastic mounting of the stator in accordance with the invention.

Assembly of the various components of the alternator shown in FIGS. 2 and 3 is carried out in the following way. The annular centering ring 52 is fitted into the casing part 18, the open face of which is preferably orientated upwardly for the assembly process. The stator 12 is then fitted into the casing part 18, with its annular and radial end face 32 in engagement in the centering ring 52.

In addition, the four cushion blocks 62 are fitted into the corresponding seatings 76 in the other casing part 16. To this end, it is possible to arrange that the transverse dimensions of the locating lugs 70 shall be slightly greater than the width of each seating 76, so as to ensure that the lug 70 is retained in position in its seating 76 by virtue of a slight compression of the material of the lug 70.

The casing part 16 is then placed in position on the casing part 18, with the engagement surfaces 66 of the cushion blocks 62 in contact against the radial and annular end face 30 of the stator 12.

The feature whereby each of the axial end faces 80 of the locating lugs 72 makes contact against the annular end face 42 of the casing part 18 enables the two casing parts to be located in position beforehand gently and without any impact. Angular alignment, or indexing, is obtained by fitting the four fastening studs 44 in position, with these latter extending through the housings defined by the respective apertures 74 of the cushion blocks. The threaded portions 46 of the shanks of the studs are subsequently screwed into the threaded holes 48 and tightened up.

Assembly is thus particularly easy to carry out, with the stator being centred by the ring 52 and immobilised in the axial direction elastically by means of the cushion blocks 62.

It will be realised that assembly can be carried out blind with the arrangement according to the invention. It is also found that only four fastening studs are required for assembling the two parts of the casing together, apart from any other complementary lug and additional screw type fastener that may be provided for locating the stator and retaining it against axial movement.

The fact that the lugs 72 have an axial overhang, prior to tightening of the clamping members, enables a check to be made that the cushion blocks are present across the axial space which separates the radial annular end faces 40 and 42 of the two casing parts 16 and 18.

What is claimed is:

1. A rotary electrical machine comprising: a casing defining an axis of rotation and a rotor chamber within the casing, the casing having two casing parts and further defining a common junction plane perpendicular to the axis of rotation, with the casing parts being brought together at the common junction plane; fastening means for securing the casing parts together; and a generally cylindrical and annular stator, disposed within the casing and defining opposed radial and annular end surfaces of the stator, each casing part defining a radial support surface, the radial support surfaces being spaced apart axially in facing relationship to each other with the stator lying between the support surfaces, the machine further having a plurality of elastically deformable elements having a cushion block portion thereof interposed in axial compression between one of the support surfaces and the end surface of the stator facing towards that support surface, whereby means are provided for clamping the stator between the support surfaces, wherein one of the casing parts defines a pitch circle, and the elastically deformable elements in the form of cushion members spaced apart along the pitch circle each having an aperture formed therein for receiving the respective means for clamping the stator, with each cushion member cushion block portion being in axial compression between the corresponding end surface of the stator and a portion of the support surface of that casing part, wherein each cushion member block is formed of elastically deformable material, the cushion member having two opposed and parallel engagement surfaces, one of which engages against the stator end face, with the other one engaging against the support surface portion of the casing.

2. A machine according to claim 1, wherein each cushion block further includes a locating lug, the casing part associated with the cushion block defining a seating for each cushion block, each locating lug being received in a respective seating with a clearance.

3. A machine according to claim 2, wherein the locating lug of each cushion block extends axially beyond one of its said engagement surfaces.

4. A machine according to claim 3, wherein the locating lug of each cushion block defines an aperture, the fastening means comprising a plurality of axially extending threaded fasteners securing the two casing parts together, each fastener having a body extending through the aperture of a corresponding one of the cushion blocks.

5. A machine according to claim 3, wherein each of the cushion blocks has two locating lugs symmetrical with each other, with each locating lug extending axially beyond a respective one of the engagement surfaces.

6. A machine according to claim 5, in which the casing part having the seatings has an open, radial, annular end face defining the junction plane, and wherein a locating lug of each cushion block is received in the corresponding seating, with its other locating lug projecting, prior to tighting of the fastening means, axially beyond the open end face.

7. A machine according to claim 1, further including an elastically deformable element in the form of an annular centering ring interposed between the other support surface and the stator end surface.

* * * * *